H. R. WARNER & B. E. RAILSON.
COMBINED ROLLER AND BALL BEARING.
APPLICATION FILED APR. 18, 1916.
1,203,164.
Patented Oct. 31, 1916.
Fig. I.
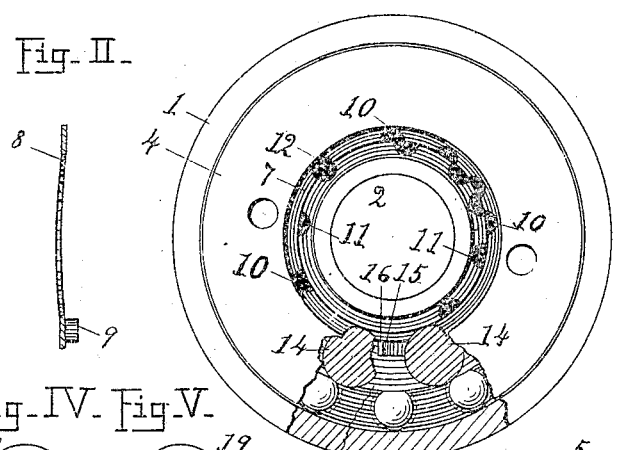
Fig. II.
Fig. III.
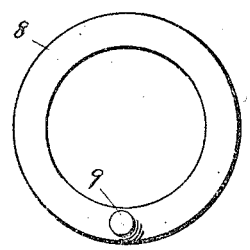
Fig. IV. Fig. V.
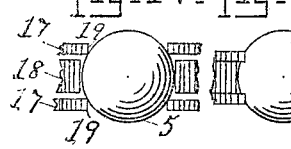
Fig. VI.
Fig. VII.
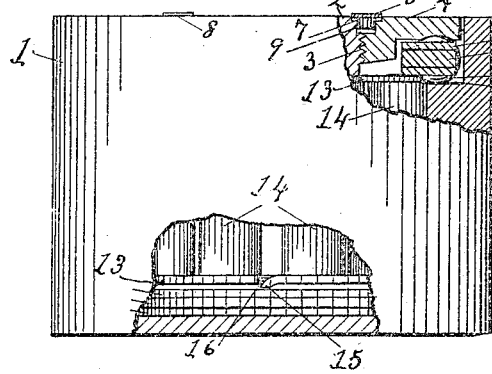
Inventors
Harold R. Warner.
Bertie E. Railson.
By W. X. Stevens
Attorney

UNITED STATES PATENT OFFICE.

HAROLD R. WARNER AND BERTIE E. RAILSON, OF SEATTLE, WASHINGTON.

COMBINED ROLLER AND BALL BEARING.

1,203,164.   Specification of Letters Patent.   Patented Oct. 31, 1916.

Application filed April 18, 1916. Serial No. 91,996.

*To all whom it may concern:*

Be it known that we, HAROLD R. WARNER and BERTIE E. RAILSON, citizens of the United States, residing at Seattle, in the county of King and State of Washington, have invented certain new and useful Improvements in Combined Roller and Ball Bearings, of which the following is a specification.

This invention relates to ball bearings for vehicle wheels, and its object is to provide means for locking the screw by which the bearings are adjusted to properly engage the balls; means for automatically working oil to the midway members of the bearing from the ends where the oil is usually applied, and means for removably securing a series of balls in a spacing web.

To this end our invention consists in the construction and combination of parts forming a combined roller and ball bearing hereinafter more fully described and particularly stated in the claim, reference being had to the accompanying drawings in which—

Figure I, is an end view of our combined roller and ball bearing, a portion being broken away, and the locking ring removed. Fig. II, shows a transverse section of the locking ring, and Fig. III, an inner face view of the same. Fig. IV, is an edgewise view on a larger scale, of a portion of one of our ball-carrying webs opened so that a ball may be removed or replaced, and Fig. V, is a similar view of the same parts with the web properly closed to hold a ball therein. Fig. VI, is a side or face view of a portion of the web carrying two balls. Fig. VII, is a side view of our ball bearing with portions broken away to expose to view certain parts hereinafter referred to.

Numeral 1 represents a bushing to be fitted into a wheel at the hub, and serving as the outer wall of our bearing. On a sleeve 2, which is to be mounted on the wheel axle, is secured at 3, a collar 4, which presses the balls 5 against inner shoulders 6 of the bushing 1 to receive the endwise thrust of the axle. Directly over the screw thread 3, we cut a circular, concentric groove 7, one half in the sleeve 2 and the other half in the collar 4, to receive a key ring 8, that carries the key pin 9. A series of half round holes 10, are made in the collar 4 at varying distances apart, and another series of like holes 11 are made in the sleeve 2 to register with the first named holes, one at a time, and form therewith a complete receptacle for the key pin 9. At 12 such a receptacle is shown, and in Fig. VII, the key pin 9 is shown in service. The key ring 8 is bent outward along two sides to project normally beyond the face of the collar 4, as shown in Figs. II, and VII, for the double purpose of being kept in its groove 7 by the usual hub collar, and to enable the operator to readily insert his finger nails under to remove it. We provide the end collars 13 of the cage that carries the rollers 14, with one or more scoops 15, at either their outer or inner edges, or both, shaped to scoop or wedge the oil they come in contact with, through the throat 16 toward the middle of the bearing. The spacing webs that carry the balls, comprise three collars, the stiff middle collar 17 which is punched at equal intervals with somewhat circular notches to freely receive the balls, and the two side collars 18 which are punched to register therewith, but with holes a little smaller than the balls, thus serving as side walls to retain the balls, yet permitting them to roll freely in these recesses. Figs. V, and VI, show how the outer prongs 19 of these side walls, at the recesses, retain the balls from escaping radially, yet our plan is to secure these side walls resiliently against the middle wall 17 so they may spread apart, as in Fig. IV, to permit the balls to be inserted or removed between the prongs 19. A simple means of accomplishing this is to secure the collars 17, 18, all together by a few rivets 20, placed as far as practicable from the prongs, and making the collars 17 of resilient material sufficiently thin to spring apart at the outer edges, the little distance required.

The various parts of this invention are designed with a view to simplicity, easy construction and low cost.

We claim—

In a combined roller and ball bearing, a web comprising three collars secured together side-by-side, the central one being of stiff material and notched at intervals in its outer edge to freely receive the balls, and the side collars being notched to register with the center one, but with notches smaller than the diameter of the balls, and the prongs at the sides of the notches having normally less space between them than the said diameter, whereby each ball may be individually caged for free rotation, and
5 means for securing the collars together for laterally resilient separation at their prongs, between which the balls may thereby be inserted or removed.

In testimony whereof we affix our signatures in presence of two witnesses.

HAROLD R. WARNER.
BERT E. RAILSON.

Witnesses:
STEPHEN FRANKLIN PIERCE,
CHAS. D. THOMAS.